United States Patent
Nishio et al.

(10) Patent No.: US 6,660,417 B1
(45) Date of Patent: Dec. 9, 2003

(54) FUEL CELL GENERATOR

(75) Inventors: Koji Nishio, Kyoto (JP); Fusao Terada, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 118 days.

(21) Appl. No.: 09/696,993

(22) Filed: Oct. 26, 2000

(30) Foreign Application Priority Data

Oct. 27, 1999 (JP) .......................................... 11-305809

(51) Int. Cl.$^7$ ............................................... H01M 8/18
(52) U.S. Cl. .............................. 429/21; 429/19; 429/20
(58) Field of Search ............................... 429/19, 20, 21

(56) References Cited

U.S. PATENT DOCUMENTS

| | | | |
|---|---|---|---|
| 5,492,777 A | * | 2/1996 | Isenberg et al. ............... 429/17 |
| 5,645,951 A | * | 7/1997 | Johnssen ...................... 429/16 |
| 5,728,483 A | * | 3/1998 | Fujitani et al. ................ 429/12 |
| 5,753,383 A | * | 5/1998 | Cargnelli et al. ........... 136/201 |
| 5,958,613 A | * | 9/1999 | Hamada et al. ............... 429/26 |
| 6,106,966 A | * | 8/2000 | Crow .......................... 204/421 |
| 6,127,055 A | * | 10/2000 | Simmons, Jr. ................ 429/12 |
| 6,279,321 B1 | * | 8/2001 | Forney ..................... 60/641.11 |
| 6,290,142 B1 | * | 9/2001 | Togawa et al. ............. 165/299 |

FOREIGN PATENT DOCUMENTS

| | | | |
|---|---|---|---|
| JP | 09195076 | * 7/1997 | ............. C25B/1/02 |
| JP | 2001057222 | * 2/2001 | ............ H01M/8/06 |

* cited by examiner

Primary Examiner—Carol Chaney
Assistant Examiner—Donald V. Scaltrito
(74) Attorney, Agent, or Firm—Merchant & Gould, P.C.

(57) ABSTRACT

The objective of the present invention is to improve the system efficiency of the fuel cell generator that generates hydrogen by electrolyzing water and generates electricity using the generated hydrogen. For this purpose, a fuel cell generator, which includes a fuel cell for generating electricity using hydrogen, a electrolytic device for electrolyzing water using electricity from an external electricity system, and a hydrogen storage device for storing the hydrogen that has been generated by the electrolytic device and supplying the stored hydrogen to the fuel cell, is equipped with an heat supplying device for supplying the heat that has been generated in the fuel cell during the electricity generation to the electrolytic device. Alternatively, a fuel cell generator, which includes a fuel cell for generating electricity using hydrogen and electrolyzing water using electricity from an external electricity system, and a hydrogen storage device for storing the hydrogen that has been generated during the electrolysis and supplying the stored hydrogen to the fuel cell during the electricity generation, is equipped with an heat supplying device for storing the heat that has been generated during the electricity generation and supplying the stored heat to the fuel cell during the electrolysis.

18 Claims, 9 Drawing Sheets

FUEL CELL GENERATOR

This application is based on an application No. 11-305809 filed in Japan, the content of which is hereby incorporated by reference.

BACKGROUND OF THE INVENTION (1) Field of the Invention

The present invention relates to a fuel cell generator that electrolyzes water to generate hydrogen and generates electricity using the hydrogen.

(2) Related Art

The fuel cell generator supplies hydrogen-rich gas to the anode of the fuel cell, oxidizer gas to the cathode, electrochemically reacts hydrogen and oxidizer to generate electricity. As described in Japanese Patent Laid-Open Publication No. Hei 10-233225, leveling off the load on the utility power system using the fuel cell generator has been recently under study.

FIG. 9 is a functional diagram of an example of the fuel cell generator.

In FIG. 9, the fuel cell generator includes a fuel cell 201, an electricity converter 202, a fuel gas supplying system 203, an oxidizer gas supplying system 204, an electrolytic device 211, a hydrogen storage device 212. The electricity converter 202 converts direct current power from the fuel cell 201 into alternating current power. The fuel gas supplying system 203 and the oxidizer gas supplying system 204 supply fuel gas and oxidizer gas to the fuel cell 201, respectively. The electrolytic device 211 electrolyzes water. The hydrogen storage device 212 stores the hydrogen generated by the electrolytic device 211. The electricity converter 202 is connected to a utility power system 210 via a switch 221, and the electrolytic device 211 is connected via a switch 222.

In this fuel cell generator in FIG. 9, the switch 222 is turned on to provide utility power to the electrolytic device 211 during the night when electricity charge is inexpensive. In this case, water is electrolyzed in the electrolytic device 211 to generate hydrogen. The generated hydrogen is stored in the hydrogen storage device 212.

On the other hand, hydrogen stored in the hydrogen storage device 212 is supplied to the anode of the fuel cell 201 via the fuel gas supplying system 203, air is supplied to the cathode via the oxidizer gas supplying system 204, and electricity is.generated in the fuel cell 201 during the daytime when the power consumption is at its peak. In this case, the direct current power generated in the fuel cell 201 is converted into alternating current power and to be supplied to the utility power system 210 via the switch 221.

In this manner, hydrogen is generated using inexpensive electricity during the night, and electricity is generated using the hydrogen during the daytime to supply the generated power to the utility power system. By doing so, the power load on the utility power system can be leveled off.

SUMMARY OF THE INVENTION

It is accordingly the object of the present invention to improve the system efficiency of the fuel cell generator.

The above-mentioned object may be achieved by a fuel cell generator including: a fuel cell that generates electricity using hydrogen; an electrolytic device that electrolyzes water using electricity from an external electricity system; a hydrogen storage device that (A) stores hydrogen that has been generated in the electrolytic device during the electrolysis and (B) supplies the stored hydrogen to the fuel cell; and an heat supplying device that supplies heat that has been generated in the fuel cell during the electricity generation to the electrolytic device.

In the fuel cell generator, it is preferable to provide the heat supplying device with a heat storage unit for storing heat and to supply heat to the electrolytic device during the operation of the electrolytic device so that the heat that has been generated during the operation of the fuel cell is used by the electrolytic device. For this purpose, it is also preferable to design an electrolytic cell of the electrolytic device to keep warm.

By doing so, the heat generated during the electricity generation by the fuel cell is used for heating the electrolytic device and less amount of electricity is consumed for the electrolysis. As a result, the system efficiency is improved compared with the conventional fuel cell generator.

This can be explained as follows. Water electrolysis is an endothermic reaction, so that heat needs to be supplied to the water that is to be electrolyzed in the electrolytic device. For this reason, the higher the temperature of the water that is electrolyzed, the less the amount of energy that is consumed in the electrolytic device.

Also, the fuel cell generator of this kind is mainly operated during the night when the environmental temperature is low. Accordingly, the temperature of the electrolytic device is also low, so that a large amount of electricity tends to be consumed for the electrolysis. In the fuel cell generator of the present invention, however, the heat that has been generated in the fuel cell during the electricity generation is used for the electrolysis. As a result, the amount of electricity consumed by the electrolytic device can be drastically reduced.

The above-mentioned object may be also achieved by a fuel cell generator including a fuel cell that has a function to generate electricity using hydrogen and another function to electrolyze water using electricity from an external electricity system. In this case, the same function as the fuel cell generator that has been described above can be realized without disposing an electrolytic device. As a result, the facility cost can be reduced.

BRIEF DESCRIPTION OF THE DRAWINGS

These and other objects, advantages and features of the invention will become apparent from the following description thereof taken in conjunction with the accompanying drawings which illustrate a specific embodiment of the invention. In the Drawings.

DESCRIPTION OF THE PREFERRED EMBODIMENT

The First Embodiment
(Overall Structure and Operation of Fuel Cell Generator)

Figure 1:
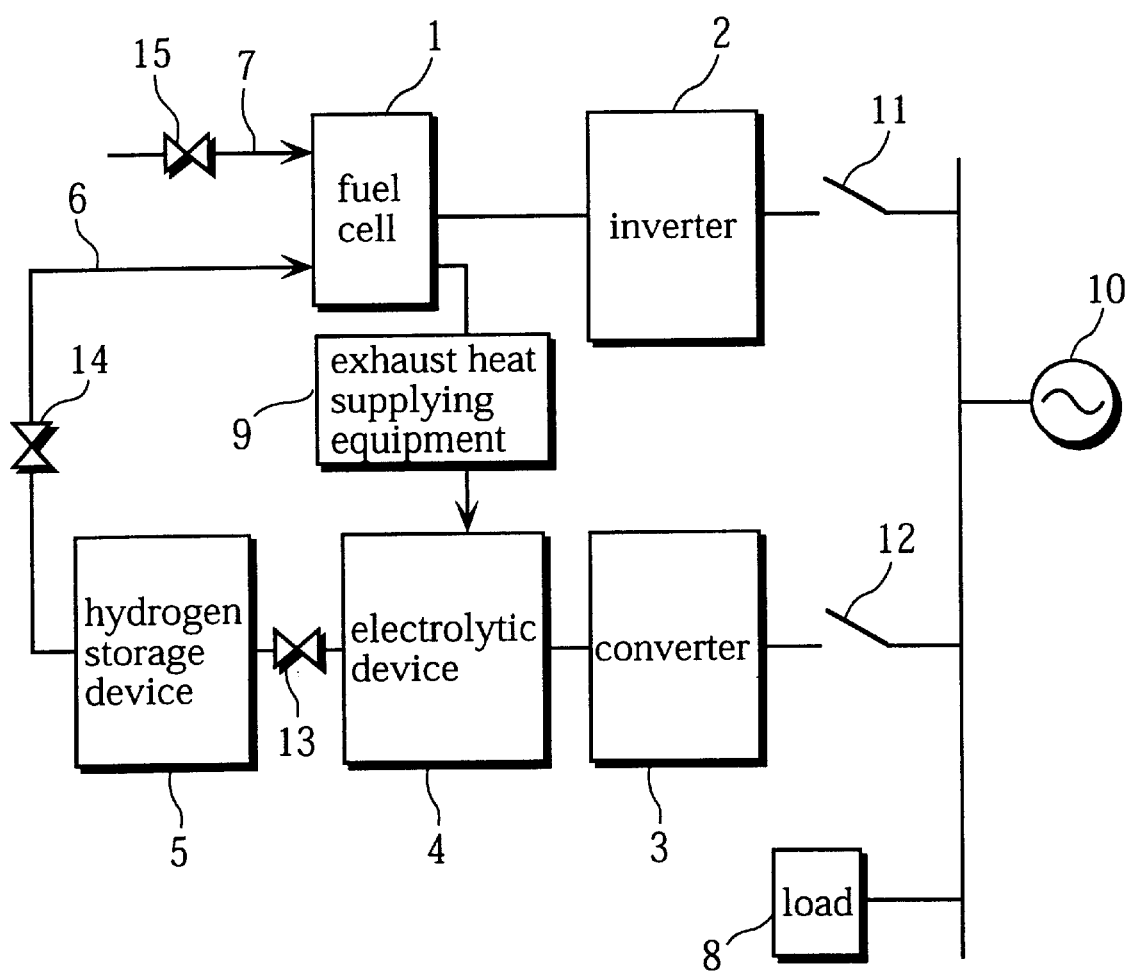
FIG. 1 is a functional diagram of a fuel cell generator according to the first embodiment.

FIG. 1 is a functional diagram of a fuel cell generator according to the first embodiment.

Figure 2:
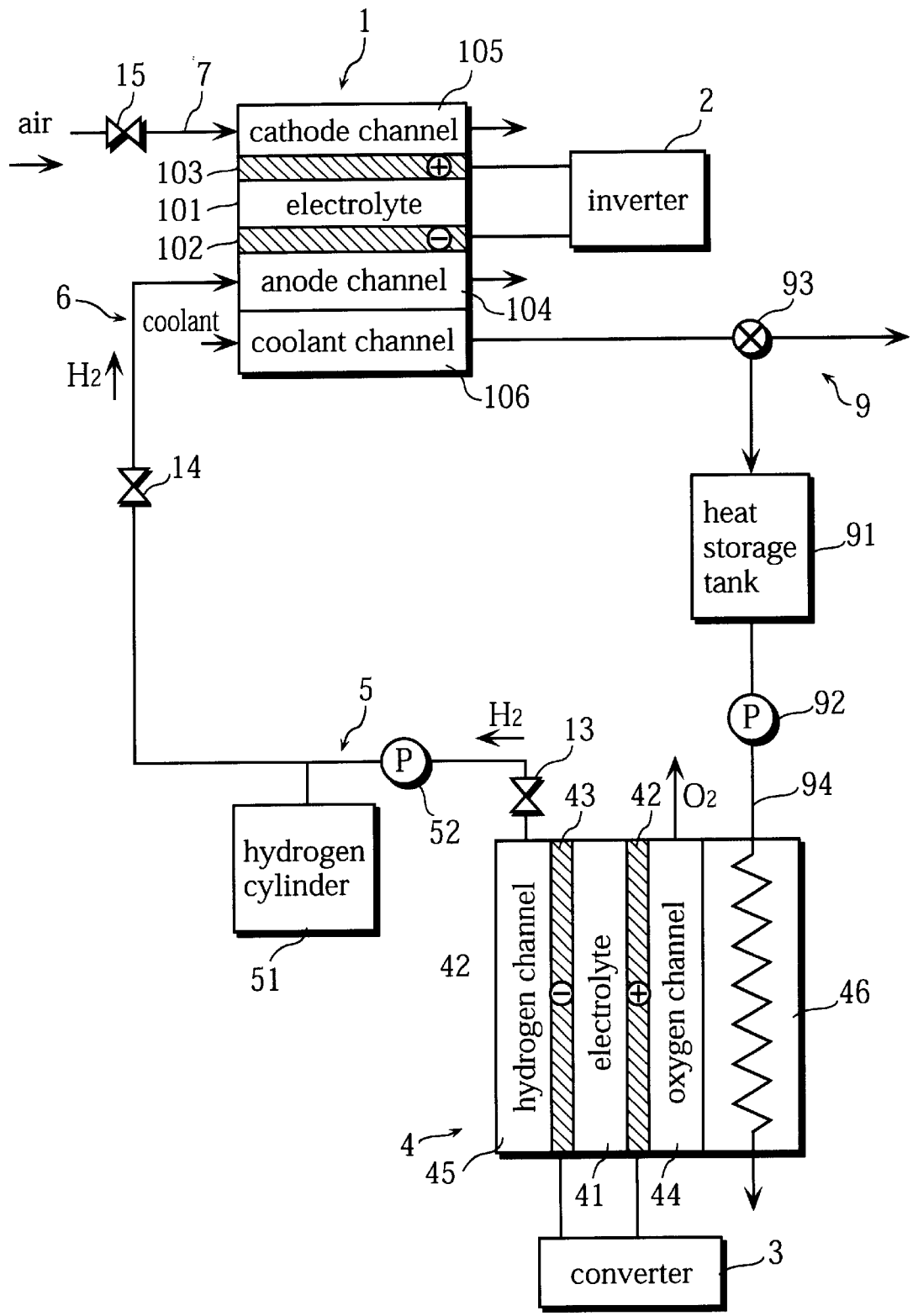
FIG. 2 shows a specific example of a part of the fuel cell generator in FIG. 1.
Figure 3:
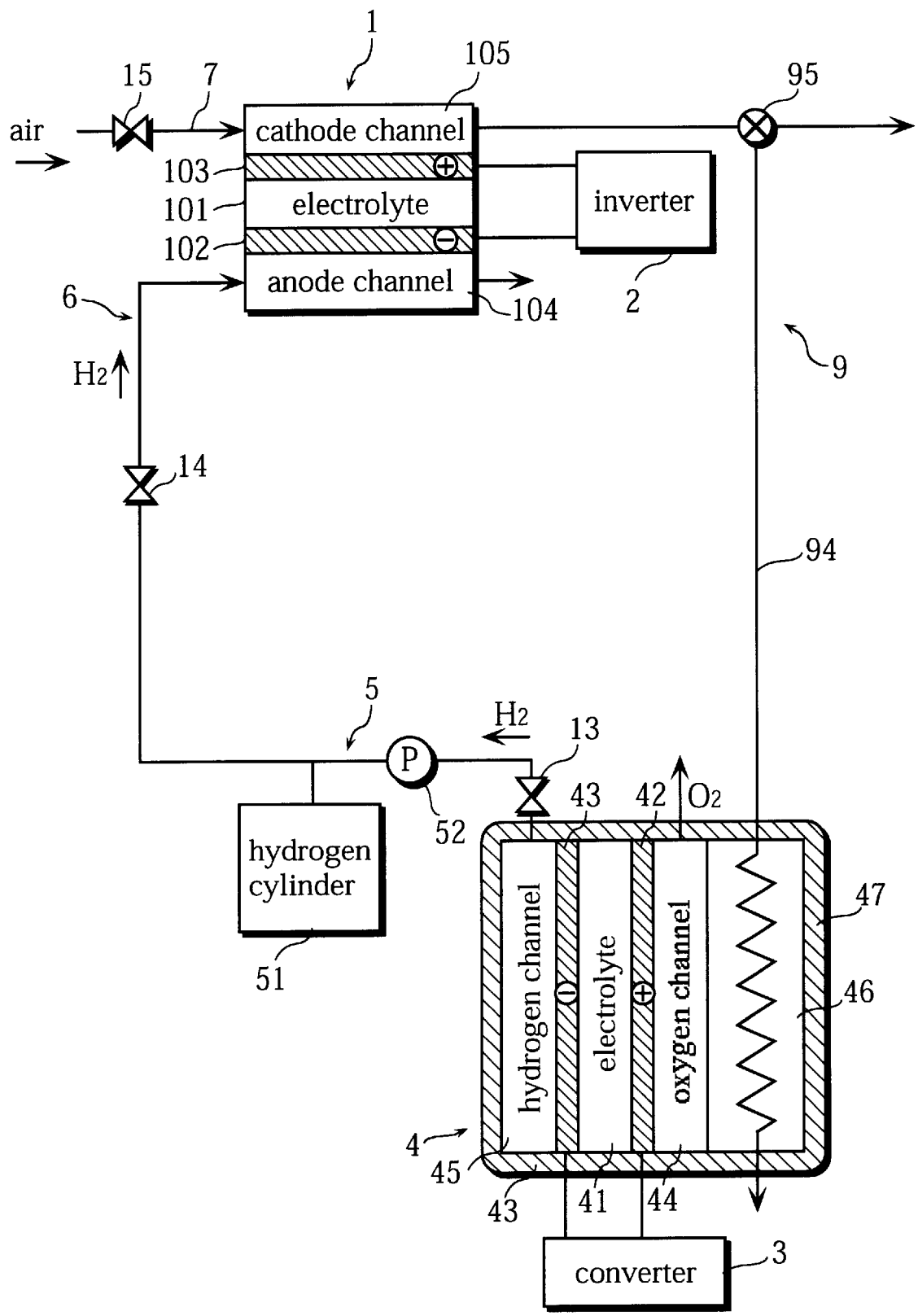
FIG. 3 shows a specific example of a part of the fuel cell generator in FIG. 1.

FIGS. 2 and 3 show specific examples of a fuel cell 1, an electrolytic device 4, a hydrogen storage device 5, and an exhaust heat supplying equipment 9 of the fuel cell generator in FIG. 1.

As shown in FIG. 1, the fuel cell generator includes the fuel cell 1, the electrolytic device 4, the hydrogen storage device 5, and the exhaust heat supplying equipment 9. The electrolytic device 4 electrolyzes water. The hydrogen storage device 5 stores the hydrogen generated in the electrolytic device 4. The exhaust heat supplying equipment 9 supplies exhaust heat from the fuel cell to the electrolytic device 4. The fuel cell generator further includes an inverter 2, a first switch 11, a converter 3, and a second switch 12. The inverter 2 converts the direct current power generated in the fuel cell 1 into alternating current power in order to exchange electricity with a utility power system 10. The first switch 11 connects and disconnects the inverter 2 to and from the utility power system 10. The converter 3 converts the alternating current power from the utility power system 10 into direct current power. The second switch 12 connects and disconnects the utility power system 10 to and from the converter 3.

The electrolytic device 4 and the hydrogen storage device 5 are connected to each other via a hydrogen pipe provided with a first valve 13. The hydrogen storage device 5 and the fuel cell 1 (an anode channel 104 in FIG. 2) are connected to each other via a hydrogen pipe 6 provided with a second valve 14. To a cathode channel 105, an oxidizer pipe 7 equipped with an oxidizer supplying valve 15 is connected at the entrance.

As shown in FIG. 2, the fuel cell 1 includes a cell that is formed by sandwiching an electrolyte 101 between an anode 102 and a cathode 103. Also, the fuel cell 1 includes the anode channel 104 for supplying fuel (hydrogen) to the anode 102, the cathode channel 105 for supplying oxidizer (air) to the cathode 103, and a coolant channel 106 through which coolant passes.

The fuel cell 1 is a general fuel cell such as the polymer electrolyte fuel cell and the phosphoric acid type fuel cell.

While the electrolytic-device 4 can be a general electrolytic device including an electrolytic cell and an electrode, the electrolytic device 4 in FIG. 2 includes an electrolyte 41, an anode 42, a cathode 43, an oxygen channel 44, a hydrogen channel 45, and a water supplying unit 46. The oxygen and the hydrogen pass through the oxygen channel 44 and the hydrogen channel 45, respectively. The water supplying unit 46 supplies pure water to the oxygen channel 44. Note that the water supplying unit 46 can stores pure water for electrolysis during the night.

While pure water is supplied to the oxygen channel 44 from the water supplying unit 46, a voltage is applied between the anode 42 and cathode 43. As a result, the water supplied to the oxygen channel 44 reaches the electrolyte 41, the anode 42, and the cathode 43 to be decomposed. Then, the generated hydrogen and oxygen flow into the hydrogen channel 45 and the oxygen channel 44, respectively.

Note that a well-known electrolytic device of this type uses an SPE (Solid Polymer Electrolyte) as the electrolyte. This electrolytic device has almost the same basic structure as the polymer electrolyte fuel cell.

The hydrogen storage device 5 can be composed of a hydrogen cylinder 51 and a conveying pump 52 as shown in FIG. 2. The hydrogen storage device 5 can also be a hydrogen storage alloy tank.

The hydrogen storage alloy tank does not need any conveying pumps. The hydrogen storage alloy tank, however, needs to be cooled down when charged with hydrogen and to be heated when emitting hydrogen. For this purpose, a heating/cooling device is necessary.

Here, an explanation of the operation by the fuel cell generator will be given.

Generally, the power consumption is at its peak 1 to 4 p.m. (referred to the "first time period" in this specification) for the utility power. Attempts have been made to level off the power load on the utility power system by shifting a part of the power consumption during the first time period to another time period, for instance, a time period during the night when the electricity is inexpensive (referred to the "second time period" in this specification).

In consideration of this point, the fuel cell 1 is operated and the generated power is supplied to the utility power system 10 (or a load 8) during the first time period (1 to 4 p.m.). On the other hand, electricity is obtained from the utility power system 10 to operate the electrolytic device 4 in order to level off the load on the utility power system 10 during the second time period (11 p.m. to 7 a.m.). Note that the first and second time periods can be any time periods and be set according to the charge system of the electric utility.

For this purpose, the fuel cell generator is equipped with a controller with a built-in timer (not illustrated). The controller controls the valves 13 to 15 and the switches 11 and 12 so as to open/close the valves 13 to 15 and turn on/off the switches 11 and 12 as follows.

First Time Period (Daytime)

When it is the start of the first time period (1 p.m.), the second valve 14 and the oxidizer supplying valve 15 are open. As a result, hydrogen is supplied to the anode channel 104 and air (oxidizer) to the cathode channel 105 in the fuel cell 1. The fuel cell 1 starts generating electricity.

Then, after a small amount of time (for instance, several minutes) until the fuel cell 1 starts generating rated power has elapsed, the first switch 11 is turned on. As a result, the electricity generated in the fuel cell 1 is converted into alternating current power by the inverter 2 to be supplied to the load 8 or the utility power system 10.

Then, when it is the end of the first time period (4 p.m.), the second valve 14 and the oxidizer supplying valve 15 are closed and the first switch is turned off. As a result, the operation of the fuel cell 1 is stopped.

Second Time Period (Night)

During the second time period, the second switch 12 is turned on and the first valve 13 is open. Note that the first switch 11 remains off and the second valve 14 and the oxidizer supplying valve 15 remain closed. As a result, the electricity from the utility power system 10 is converted into direct current power by the converter 3 to be supplied to the electrolytic device 4. Also, the hydrogen generated in the electrolytic device 4 is stored in the hydrogen storage device 5.

In addition, in the fuel generator according to the present embodiment, the controller drives the exhaust heat supplying equipment 9 so as to supply the heat generated during the operation of the fuel cell 1 to the electrolytic device 4.

Here, this will be explained in detail with reference to FIGS. 2 and 3.

(Explanation of Electrolytic Device 4 and Exhaust Heat Supplying Equipment 9)

In the example in FIG. 2, the fuel cell 1 is a water-cooled fuel cell. The exhaust heat supplying equipment 9 is equipped with a heat storage tank 91, a switching valve 93, a pump 92, and a pipe 94. The heat storage tank 91 stores hot water discharged from the coolant channel 106. The pump 92 and the pipe 94 send the hot water from the heat storage tank 91 to the electrolytic device 4. In FIG. 2, the pipe 94 is inserted into the water supplying unit 46 so as to supply heat to the pure water that the water supplying unit 46 supplies to the oxygen channel 44. The pipe 94, however, may be disposed inside of or around the electrolytic device 4 so as to exchange heat with the electrolytic device 4 as a whole.

The controller controls the switching valve 93 so as to guide the hot water from the coolant channel 106 (at 60 to 80° C.) into the heat storage tank 91 during the operation of the fuel cell 1 (during the first time period). On the other hand, the controller drives the pump 92 to allow the hot water to pass through the pipe 94 during the operation of the electrolytic device 4 (during the second time period).

By doing so, the hot water stored in the heat storage tank 91 is supplied to the electrolytic device 4 during the operation of the electrolytic device 4. The electrolysis is performed when the electrolyte 41 and the surroundings are heated as high as approximately 60° C., so that less electricity is required for the electrolysis.

As has been described, the exhaust heat supplying equipment 9 supplies heat to the electrolytic device 4 as follows in this example. The electrolyte 41 is heated by heating the electrolytic cell of the electrolytic device 4. The exhaust heat supplying equipment 9 may supply heat to the electrolytic device 4, however, in this manner. The pipe 94 is disposed around the water supplying unit 46 and the electrolyte 41 so as to intensively heat the electrolyte 41 (generally, intensively heat the electrolytic cell).

Also, the pipe 94 may be disposed so as to supply the hot water stored in the heat storage tank 91 to the water supplying unit 46 and electrolyze the hot water itself. In this case, the hot water discharged from the fuel cell 1 is directly electrolyzed without any heat exchangers. As a result, the system efficiency is further improved and the structure is simple.

Also, the exhaust heat supplying equipment 9 is equipped with the heat storage tank 91 in order to store hot water in FIG. 2. When the electrolytic device 4 (especially, the water supplying unit 46 and the electrolyte 41) is designed to keep warm and the hot water discharged from the coolant channel 106 is guided into and stored in the water supplying unit 46, this hot water can be used for electrolysis during the second time period. Accordingly, the exhaust heat supplying equipment 9 needs not to be equipped with the heat storage tank 91 in this case.

In the example in FIG. 3, the fuel cell 1 is an air-cooled fuel cell. The exhaust heat supplying equipment 9 is equipped with a pipe 94 and a switching valve 95 for sending discharged air to the electrolytic device 4. The pipe 94 is disposed inside or around the electrolytic device 4 so as to exchange heat with the electrolytic device 4.

Also, the electrolytic device 4 is separated from the surroundings by an heat insulating unit 47 and keeps warm.

The controller controls the switching valve 95 so as to allow the air discharged from the cathode channel 105 (at approximately 60 to 80° C.) to pass through the pipe 94 during the first time period (during the daytime).

By doing so, the electrolytic device 4 is heated and hot water is stored in the water supplying unit 46 during the first time period. On the other hand, during the second time period, the electrolysis is performed when the electrolyte 41 of the electrolytic device 4 is heated, so that less electricity is required for the electrolysis.

Note that also in the case of the example in FIG. 3, the pipe 94 may be disposed around the water supplying unit 46 and the electrolyte 41 so as to intensively heat the electrolyte 41 (the electrolytic cell).

As has been described, the fuel cell generator according to the present embodiment levels off the load of electricity and requires less amount of electricity for electrolysis compared with the conventional fuel cell generator. As a result, the system efficiency is improved. Especially the system efficiency is drastically improved when the temperature is low during the night in cold climates during winter, for instance.

(Reason why Heat Supply to Electrolytic Device Reduces Electricity Consumption)

Water electrolysis is an endothermic reaction. For this reason, heat needs to be supplied to the electrolytic cell for the reaction in the electrolytic device. As a result, the higher the temperature of the electrolytic cell, the smaller the amount of electric energy that needs to be supplied for the electrolysis. Here, this will be explained in detail with reference to figures.

Figure 4:
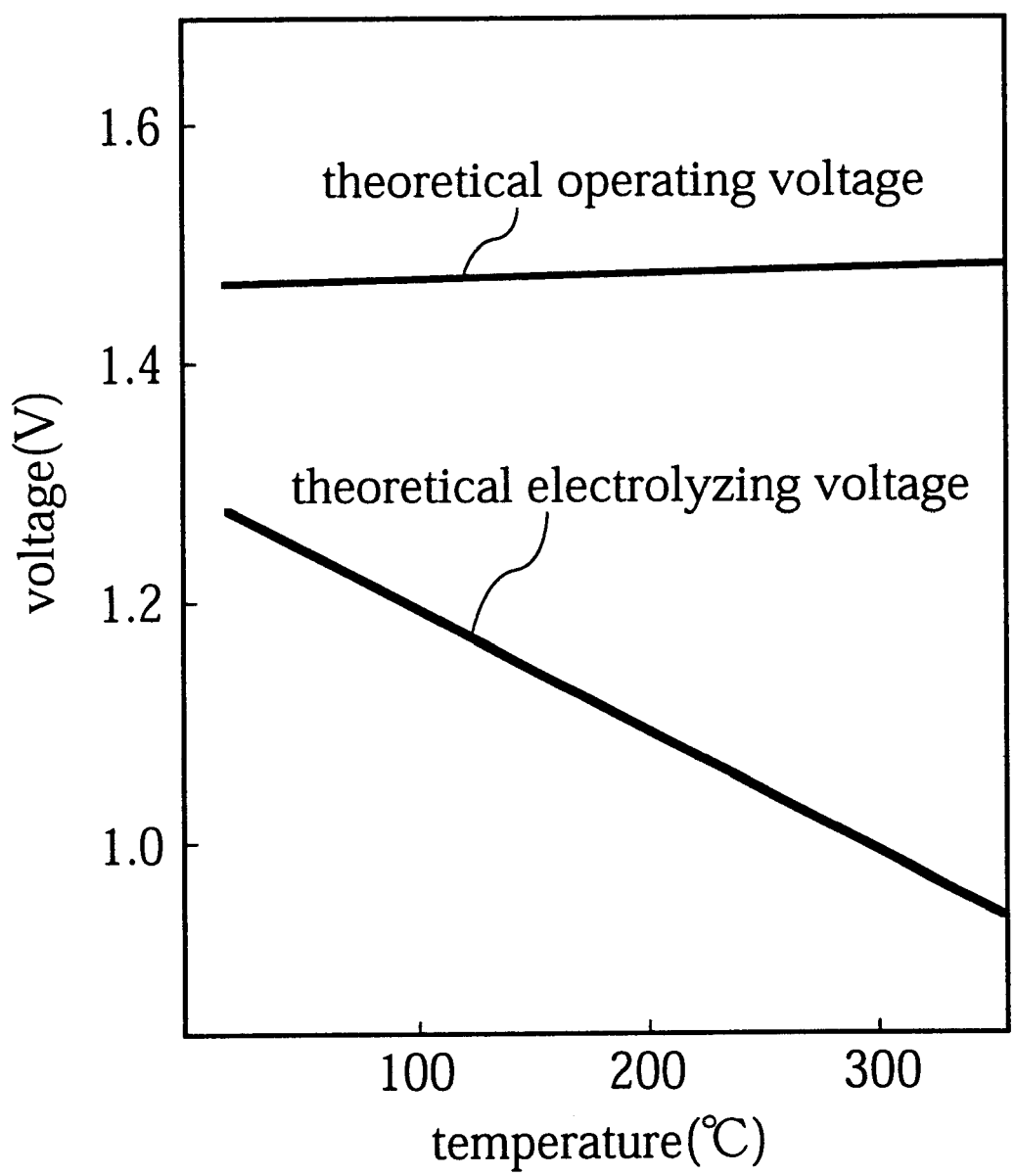
FIG. 4 is a plot showing the relationship between the temperature and the theoretical operating and electrolyzing voltages.

FIG. 4 is a plot showing the relationship between the temperature and the theoretical operating and electrolyzing voltages.

In FIG. 4, the "theoretical operating voltage" indicates the total energy required for electrolysis that is expressed in the unit of voltage, while the "theoretical electrolyzing voltage" indicates a part of the energy that is to be supplied as voltage.

The difference between the theoretical operating voltage and the theoretical electrolyzing voltage in FIG. 4 shows the energy that is to be supplied as heat such as exothermic heat due to overvoltage or ohmic loss apart from the heat that is applied from the outside.

As shown in FIG. 4, there is a negative correlation between the theoretical electrolyzing voltage and the temperature. The lower the temperature, the larger the amount of energy to be supplied as voltage while the higher the temperature, the smaller the amount of energy to be supplied as voltage.

(Other Possible Modifications)

Figure 5:
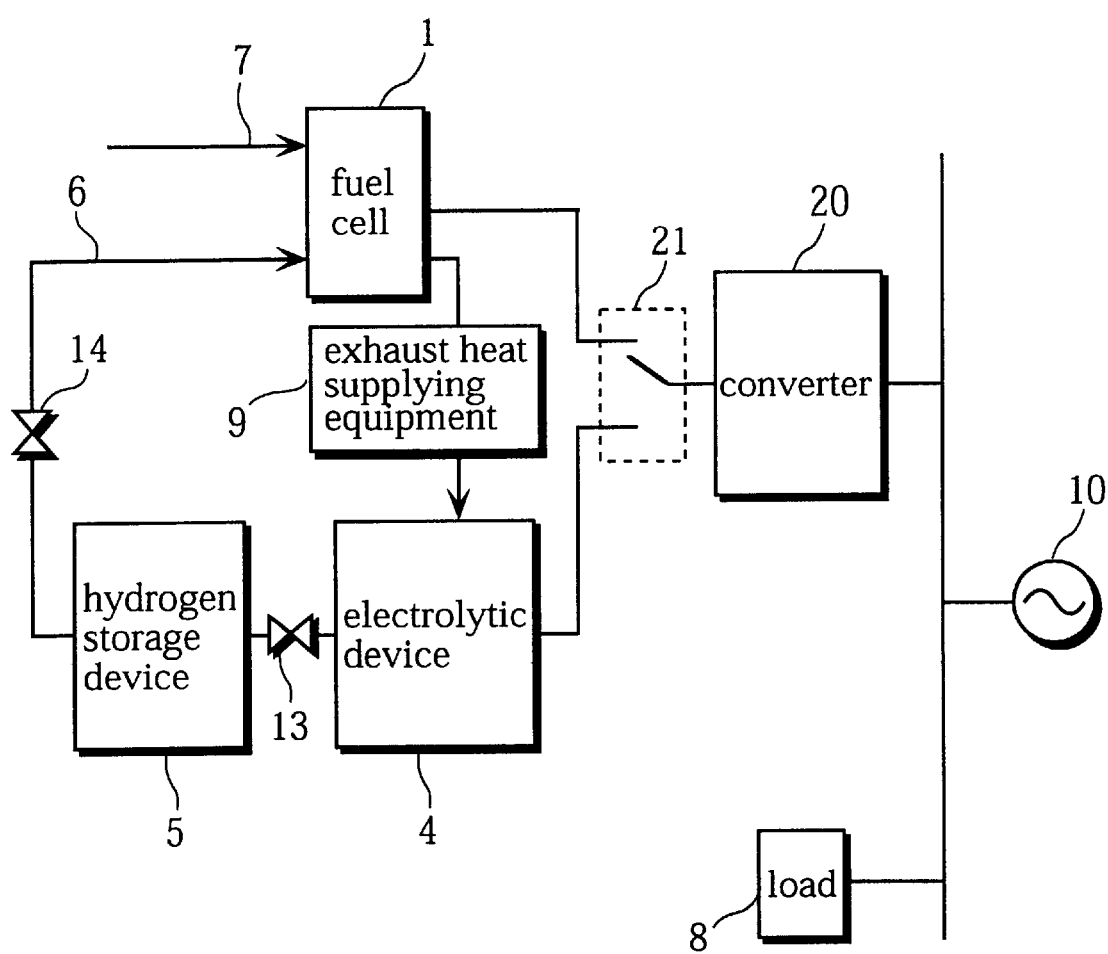
FIG. 5 is a functional diagram of a possible modification of the fuel cell generator according to the first embodiment.

In the present embodiment, the invertor 2 for converting direct current power into alternating current power and the converter 3 for converting alternating current power into direct current power are used. Also, the switches 11 and 12 are disposed for the inverter 2 and the converter 3, respectively. Instead, as shown in FIG. 5, a bi-directional converter (a converter 20) for converting direct current power into alternating current power and vice versa and a selection switch 21 may be used for realizing the same function.

Figure 6:
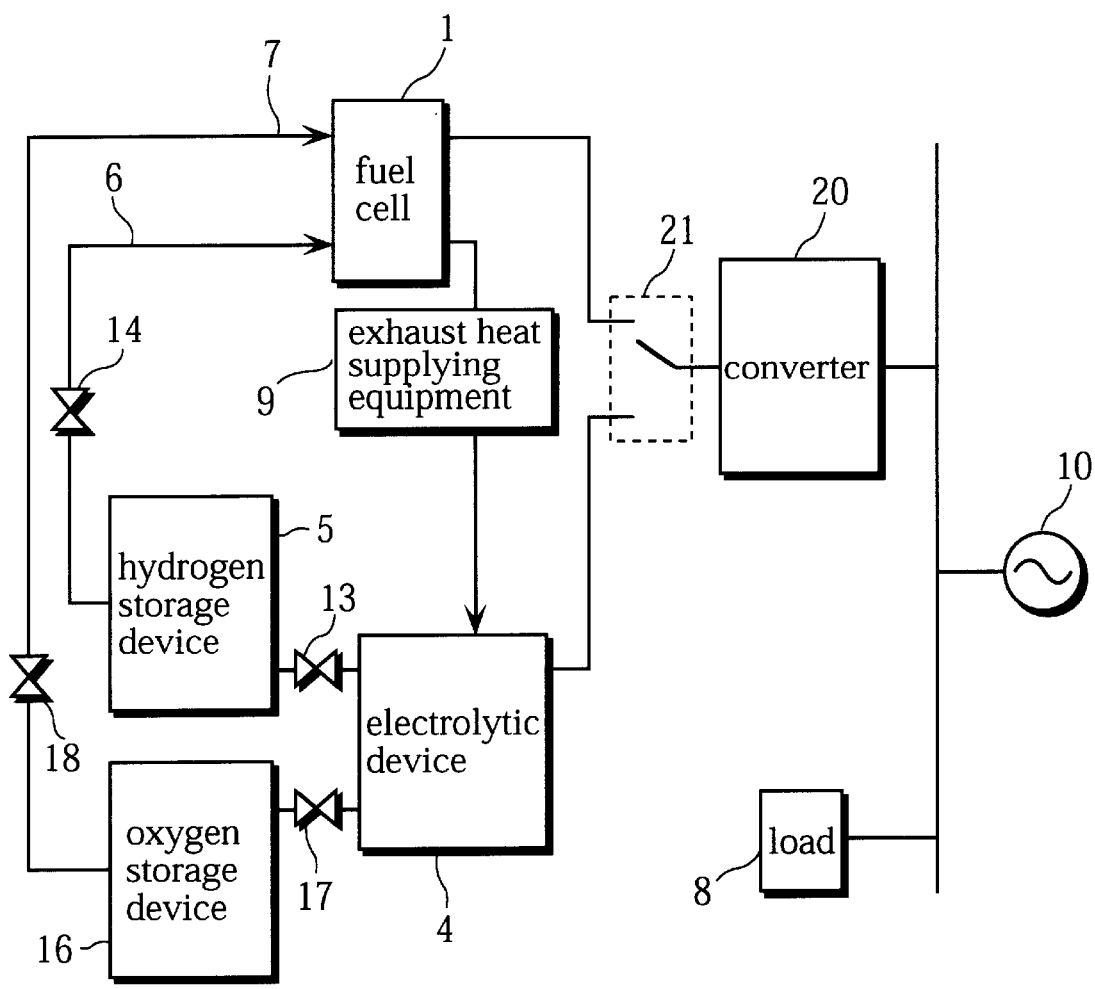
FIG. 6 is a functional diagram of a possible modification of the fuel cell generator according to the first embodiment.

Also, as shown in FIG. 6, the fuel cell generator may include an oxygen storage device 16, an oxygen pipe equipped with a valve 17, an oxygen pipe 7 equipped with a valve 18, the hydrogen and the oxygen generated in the electrolytic device 4 may be stored in the hydrogen storage device 5 and the oxygen storage device 16, and the stored hydrogen and oxygen may be supplied to the fuel cell 1 during the operation of the fuel cell 1.

The oxygen storage device 16 is composed of an oxygen cylinder and a conveying pump as in the case of the hydrogen storage device 5, for instance.

Generally speaking, the high pressure fuel cell and the high pressure type electrolytic device are used as the fuel cell and the electrolytic device.

By using the high pressure fuel cell as the fuel cell 1, the fuel cell 1 is operated at a high temperature. Also, by supplying the exhaust heat, the temperature of the hot water for electrolysis is heated by approximately 20° C. As a result, the system efficiency is further improved.

In addition, the high pressure type electrolytic device may be used as the electrolytic device 4.

The high pressure type electrolytic device is operated at a pressure of several to 30 atm and improves the power efficiency by several % compared with the atmospheric pressure type electrolytic device.

When a high pressure type electrolytic device is used as the electrolytic device 4 and a hydrogen cylinder is used as the hydrogen storage device 5, the hydrogen generated in the electrolytic device 4 is pressurized, so that the hydrogen can be stored in the hydrogen storage device 5 without further pressurization. As a result, the conveying pump 52 needs not to be disposed and, so that the system efficiency can be improved.

The Second Embodiment

Figure 7:
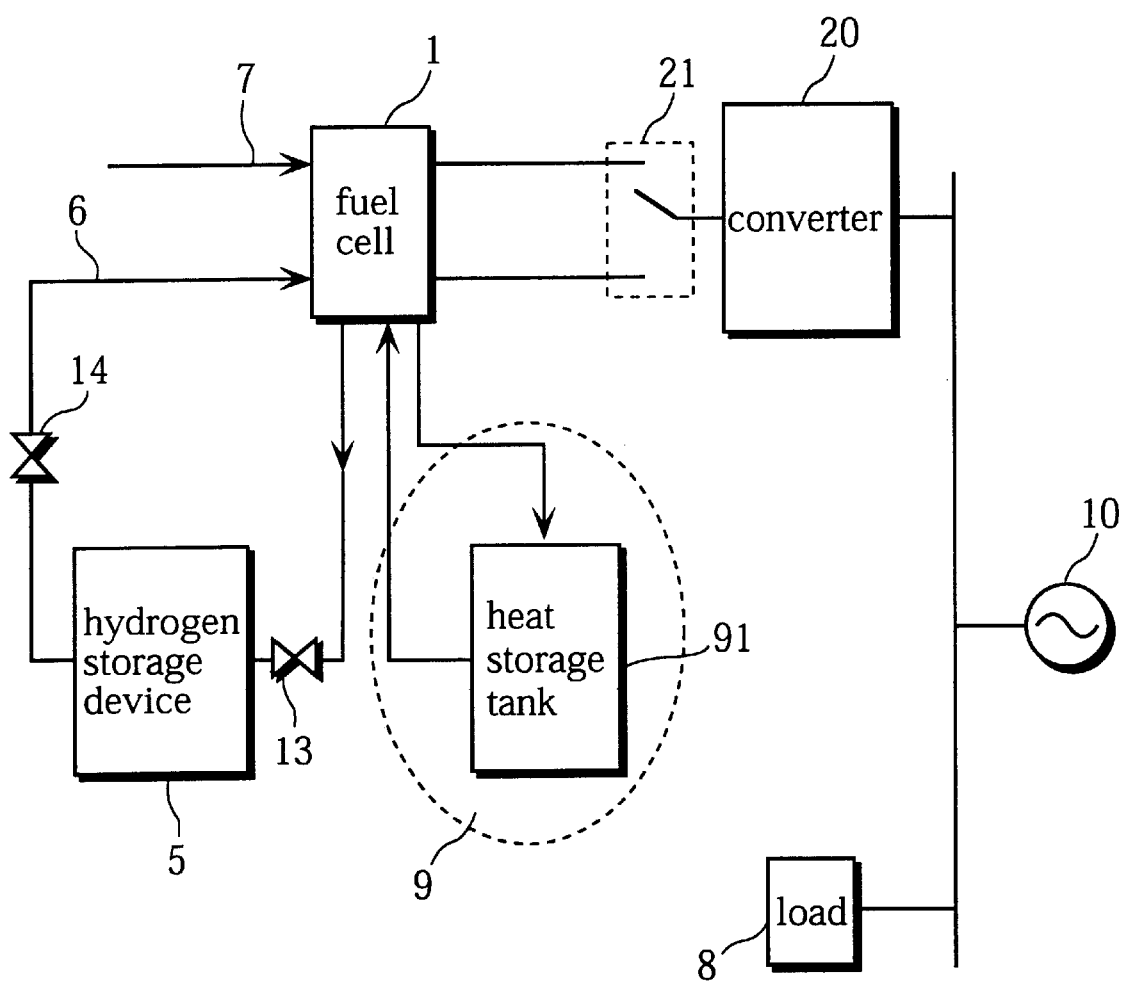
FIG. 7 is a functional diagram of a fuel cell generator according to the second embodiment.

FIG. 7 is a functional diagram of a fuel cell generator according to the second embodiment.

The fuel cell generator according to the second embodiment is different from the fuel cell generator according to the first embodiment in using the fuel cell 1 for electrolysis during the night.

As has been described, the electrolytic device that electrolyzes water using the SPE has the same structure as the polymer electrolyte fuel cell. Accordingly, the fuel cell 1 can function as the electrolytic device 4.

In the fuel cell generator according to the present embodiment, the exhaust heat supplying equipment 9 includes the heat storage tank 91. The heat generated during the power generation in the fuel cell 1 (during the first time period) is stored in the heat storage tank 91. On the other hand, during the electrolysis in the fuel cell 1 (during the second time period), the water that has been heated by this heat. By doing so, less amount of electricity is required for electrolysis and system efficiency is improved as in the case of the first embodiment. In addition, according to the present embodiment, the fuel cell 1 also functions as the electrolytic device, so that the facility cost can be reduced.

A more detailed explanation will be given with reference to figures.

Figure 8:
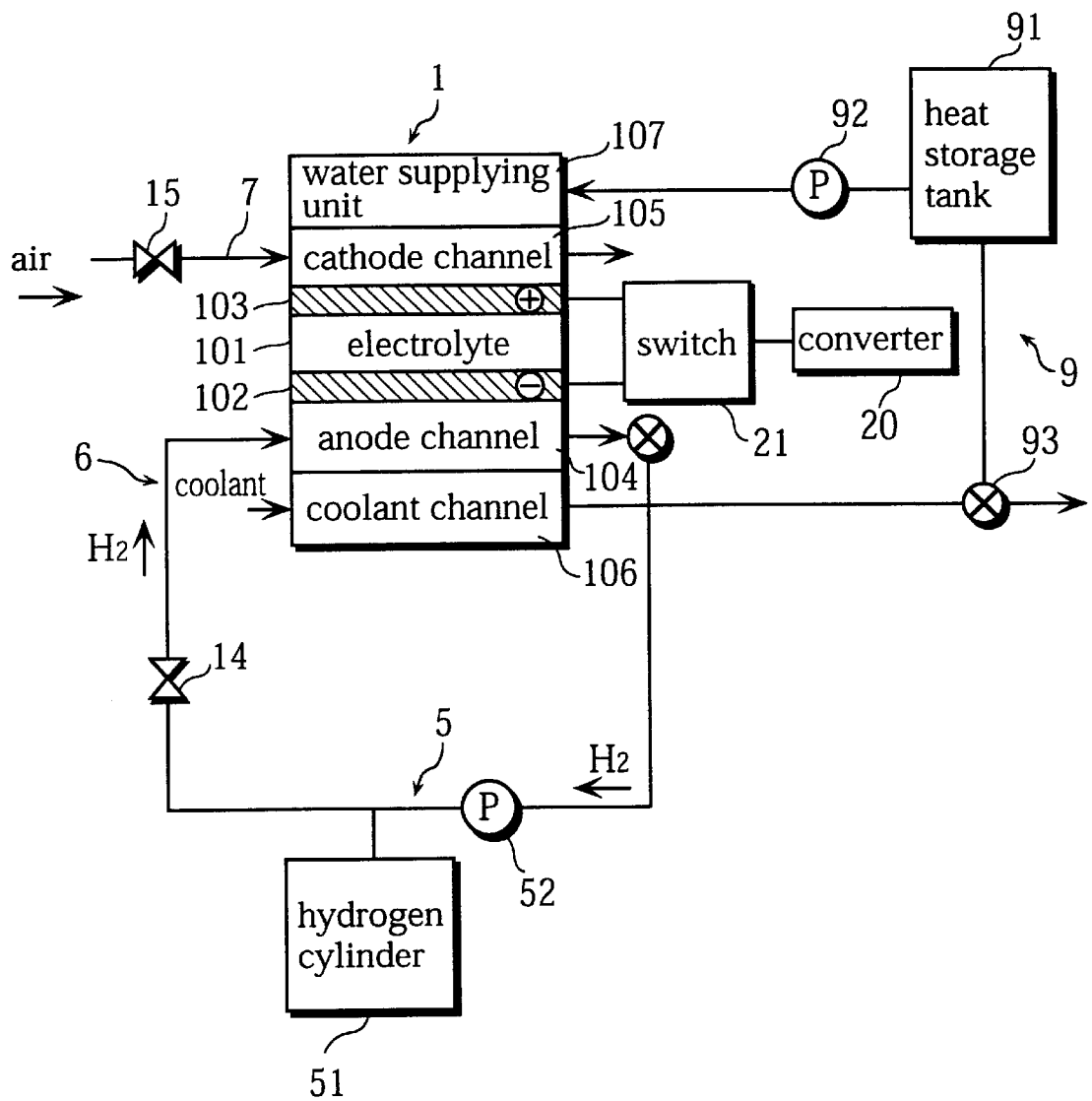
FIG. 8 shows a specific example of a part of the fuel cell generator in FIG. 7.
Figure 9:
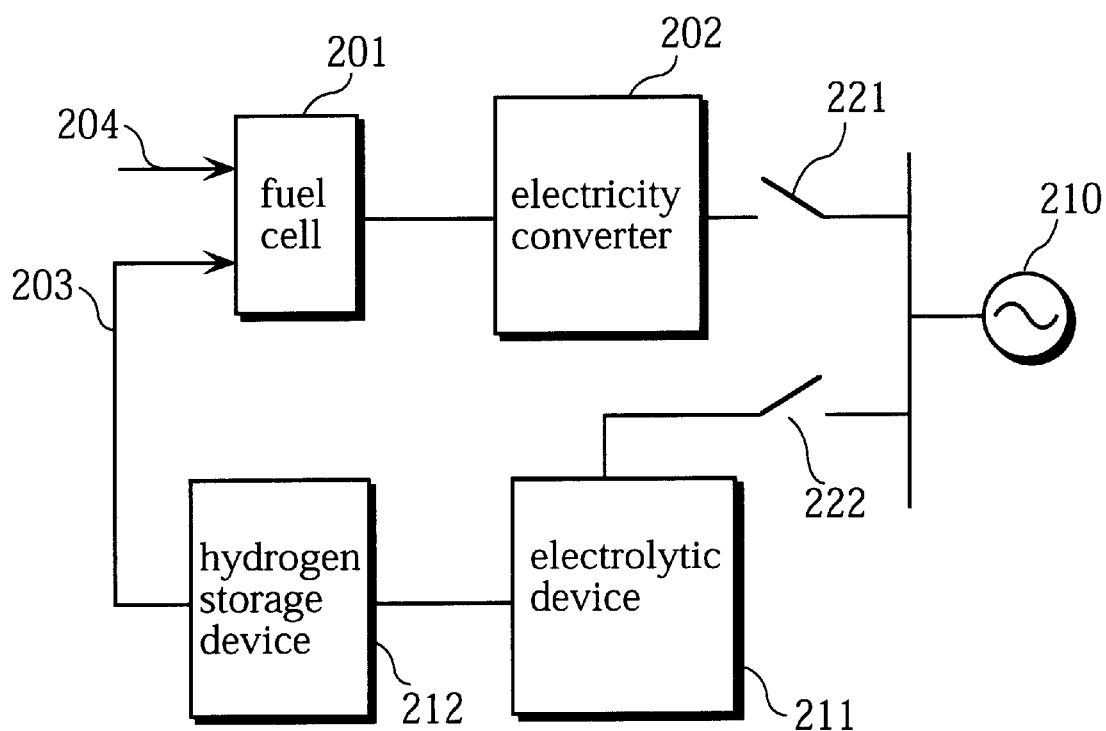
FIG. 9 is an example of the conventional fuel cell generator.

FIG. 8 shows a specific example of the fuel cell 1, the hydrogen storage device 5, and the exhaust heat supplying equipment 9 of the fuel cell generator in FIG. 7.

In the example in FIG. 8, the fuel cell 1 is a water-cooled fuel cell. The fuel cell 1 includes a water supplying unit 107 for supplying water to the cathode channel 105.

The exhaust heat supplying equipment 9 includes the heat storage tank 91, the switching valve 93, and the pump 92. The heat storage tank 91 stores hot water discharged from the coolant channel 106. The pump 92 sends hot water from the heat storage tank 91 to the water supplying unit 107.

Then, the controller (not illustrated) opens the second valve 14 and the oxidizer supplying valve 15, sends hydrogen and air to the fuel cell 1, and send coolant during the first time period. Also, the controller controls the switching valve 93 so as to guide the hot water discharged from the coolant channel 106 (at approximately 60 to 80° C.) into the heat storage tank 91. As a result, electricity is generated in the fuel cell and hot water is stored in the heat storage tank 91.

On the other hand, during the second time period, the controller closes the second valve 14 and supplies electricity from the converter 20 to the anode 102 and the cathode 103. Also, the controller drives the pump 92 to supply the hot water stored in the heat storage tank 91 to the water supplying unit 107. As a result, water is electrolyzed in the fuel cell.

At the time of the electrolysis, the electrolyte 101 is heated by the hot water from the heat storage tank 91, so that less amount of electricity is required for the electrolysis.

Note that when the hot water from the heat storage tank 91 itself is set to be supplied to the cathode channel 105 in the water supplying unit 107, the hot water that has been discharged during power generation is directly electrolyzed without any heat exchangers. As a result, the system efficiency is further improved.

In the example in FIG. 8, the fuel cell 1 is a water-cooled fuel cell. Even if the fuel cell 1 is an air-cooled fuel cell that is cooled down by the air that passes through the cathode channel 105, the same performance can be realized. In this case, the hot air discharged from the cathode channel 105 is guided into and stored in the heat storage tank 91 during the first time period, and the hot water is supplied to the fuel cell 1 during the second time period.

Also, the fuel cell generator according to the present embodiment may include an oxygen storage device and may supply the oxygen stored in the oxygen storage device to the fuel cell 1 during the operation of the fuel cell 1 as has been described in the first embodiment.

In addition, the fuel cell may be a high pressure fuel cell. In this case, when a hydrogen cylinder is used as the hydrogen storage device 5, hydrogen can be stored in the hydrogen storage device 5 without being pressurized by the conveying pump 52.

Although the present invention has been fully described by way of examples with reference to the accompanying drawings, it is to be noted that various changes and modifications will be apparent to those skilled in the art. Therefore, unless such changes and modifications depart from the scope of the present invention, they should by construed as being included therein.

What is claimed is:

1. A fuel cell generator comprising:

a fuel cell that generates electricity using hydrogen;

an electrolytic device that electrolyzes water using electricity from an external electricity system;

a hydrogen storage device that (A) stores hydrogen that has been generated in the electrolytic device during the electrolysis and (B) supplies the stored hydrogen to the fuel cell;

a heat supplying device that supplies heat that has been generated in the fuel cell during the electricity generation to the electrolytic device; and a driving controller that (A) drives the fuel cell so as to generate electricity during a first time period and (B) drives the electrolytic device so as to electrolyze water during a second time period.

2. The fuel cell generator according to claim 1, wherein the heat supplying device includes a heat storage unit that stores the heat.

3. The fuel cell generator according to claim 2, wherein the heat supplying device further includes a heat storage controller that (A) stores the heat in the heat storage unit during the electricity generation and (B) supplies the heat from the heat storage unit to the electrolytic device during the electrolysis.

4. The fuel cell generator according to claim 1, wherein the heat supplying device supplies a heat medium to which heat has been transferred in the fuel cell to the electrolytic device.

5. The fuel cell generator according to claim 4, wherein the heat supplying device supplies hot water that has been heated in the fuel cell to the electrolytic device, and the electrolytic device electrolytes the hot water.

6. The fuel cell generator according to claim 4, wherein the heat medium is exhaust gas that has been discharged from the fuel cell.

7. The fuel cell generator according to claim 4, wherein the electrolytic device includes a water storage tank that stores and keeps water warm, and the heat supplying device supplies the heat to the water storage tank during the electricity generation.

8. The fuel cell generator according to claim 1, further comprising an oxygen storage device that stores oxygen that has been generated in the electrolytic device and supplies the stored oxygen to the fuel cell.

9. The fuel cell generator according to claim 1, wherein the fuel cell is a high pressure fuel cell.

10. The fuel cell generator according to claim 1, wherein the electrolytic device is a high pressure electrolytic device.

11. The fuel cell generator according to claim 10, wherein the hydrogen storage device includes a hydrogen cylinder.

12. A fuel cell generator comprising:

a fuel cell that has a function to generate electricity using hydrogen and another function to electrolyze water using electricity from an external electricity system;

a hydrogen storage device that (A) stores hydrogen that has been generated in the fuel cell during the electrolysis and (B) supplies the stored hydrogen to the fuel cell during the electricity generation;

a heat supplying device that (A) stores heat that has been generated in the fuel cell during the electricity generation and (B) supplies the stored heat to the fuel cell during the electrolysis; and an operation controller that controls the fuel cell (A) so as to generate electricity during a first time period and (B) so as to electrolyze water during a second time period.

13. The fuel cell generator according to claim 12, wherein the heat supplying device (A) stores a heat medium to which heat has been transferred in the fuel cell during the electricity generation and (B) supplies heat of the stored heat medium to the fuel cell during the electrolysis.

14. The fuel cell generator according to claim 13, wherein the heat supplying device (A) stores hot water that has been heated.in the fuel cell during the electricity generation and (B) supplies the stored hot water to the fuel cell during the electrolysis, and the fuel cell electrolyzes the supplied hot water during the electrolysis.

15. The fuel cell generator according to claim 13, wherein the heat medium is exhaust gas that has been discharged from the fuel cell.

16. The fuel cell generator according to claim 12, further comprising an oxygen storage device that (A) stores oxygen that has been generated during the electrolysis and (B) supplies the stored oxygen to the fuel cell during the electricity generation.

17. The fuel cell generator according to claim 12, wherein the fuel cell is a high pressure fuel cell.

18. The fuel cell generator according to claim 17, wherein the hydrogen storage device includes a hydrogen cylinder.

* * * * *